United States Patent Office 3,031,323
Patented Apr. 24, 1962

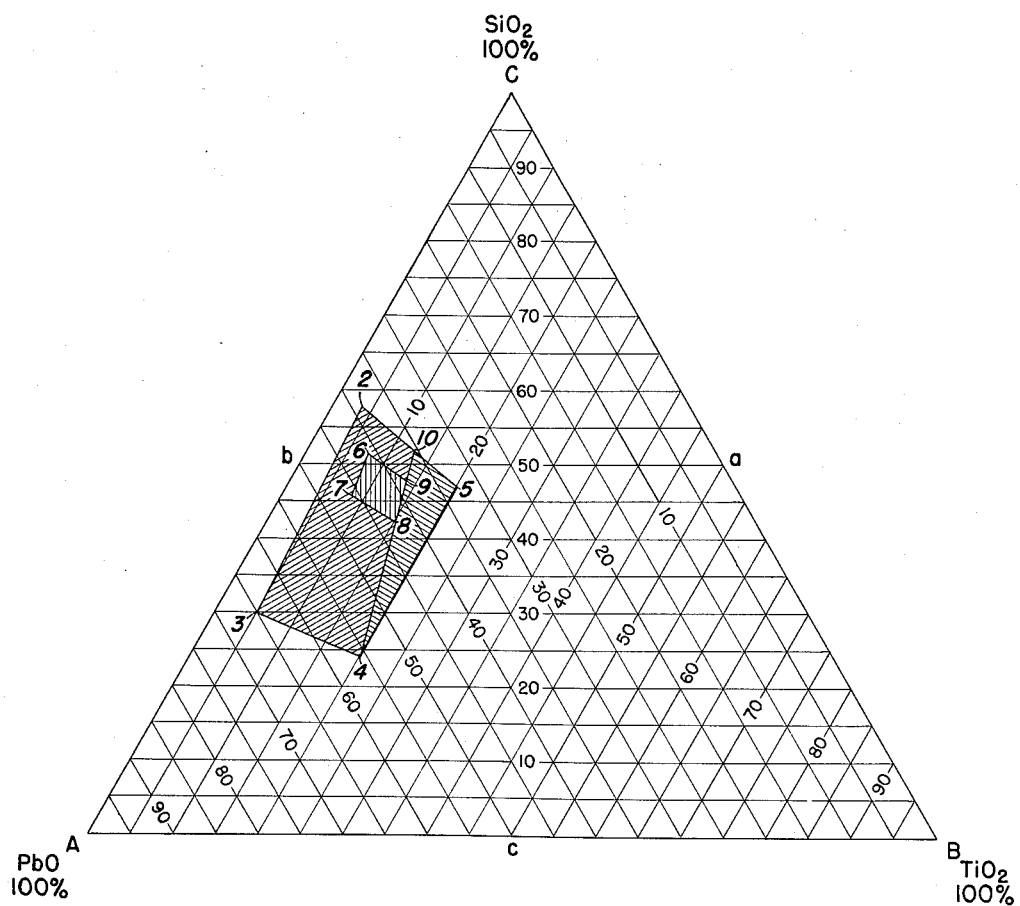
Fig. I.

3,031,323
SILICEOUS-LEAD TITANATE PIGMENT
Adrian R. Pitrot, Uniondale, N.Y., assignor to National Lead Company, New York, N.Y., a corporation of New Jersey
Filed July 20, 1959, Ser. No. 828,338
7 Claims. (Cl. 106—297)

This invention pertains to a novel lead titanate pigment.

Lead titanate, $PbTiO_3$, has long been recognized by the paint industry as one of the best durable pigments. In addition, it possesses the added advantage of tint retention which is almost perfect. These and numerous other desirable properties were evident in single pigment paints as well as in the composite pigment paints. The utilization of lead titanate was however generally limited to the mixed pigment paints in which it was associated with such pigments as zinc oxide, leaded zinc oxide, white lead, titanium dioxide barium sulfate pigments, etc.

The major disadvantage of this pigment, which has virtually completely eliminated this desirable pigment from being commercially available, is its high material and manufacturing cost.

The principal object of this invention therefore, is to provide a lead titanate pigment which will retain all characteristic pigment properties while being economically produced. Another object is to provide for a method for producing a novel lead titanate pigment. Other objects and advantages will become apparent from the following more complete description and claims.

Broadly, this invention contemplates a composite siliceous-lead titanate pigment comprising $PbO$, $TiO_2$ and $SiO_2$, the amounts of $PbO$, $TiO_2$ and $SiO_2$ being analytically present in such proportions by weight as may be represented by a point lying within that area of a trilinear diagram of composition $PbO$—$TiO_2$—$SiO_2$ defined as bounded by straight lines joining in series points represented by the compositions:

| PbO | TiO$_2$ | SiO$_2$ |
|---|---|---|
| 38.6 | 3.5 | 57.9 |
| 65.0 | 5.0 | 30.0 |
| 55.8 | 20.0 | 24.2 |
| 33.0 | 20.0 | 47.0 |

This invention also contemplates a composite siliceous-lead titanate pigment comprising $SiO_2$ coated with $PbO$ and $TiO_2$.

The novel pigment of this invention may be prepared by forming an intimate mixture containing litharge, $PbO$, titaniumdioxide $TiO_2$, and silica, $SiO_2$. This mixture is then calcined at an elevated temperature which results in a combination of the ingredients to form a lead titanate-silica pigment. This resulting pigment exists essentially in the form of a lead titanate coating on the individual particles of silica. The silica therefore is present in the pigment, and in the modified and combined pigment discussed below, without any impairment of the pigment properties of the lead titanate which exhibits the characteristic surface properties of ordinary lead titanate.

As a source of the $PbO$ ingredient, it is possible to employ litharge, lead carbonate or other lead compounds which yield $PbO$ upon heating. As a source of $TiO_2$, titanium dioxide, titanic acid or any titanium compounds yielding $TiO_2$ upon heating may be used. Sources of $SiO_2$ include precipitated silica, silicic acid or fine native silica. It has been found, for instance, that a quartzite which is readily obtainable in powder form is quite satisfactory when ground to sufficient fineness in a suitable mill such as, for example, a pebble mill.

The drawing, FIGURE 1, represents a diagram wherein the percentages of $PbO$, $TiO_2$ and $SiO_2$ are plotted on a triangular graph. Point A represents 100% litharge, $PbO$, B represents 100% titanium dioxide, $TiO_2$, and C represents 100% silica, $SiO_2$. The shaded area on the graph is bounded by straight lines joining the points 2, 3, 4 and 5, said points corresponding respectively to the following listed compositions:

| Points | Percent by weight | | |
|---|---|---|---|
| | PbO | TiO$_2$ | SiO |
| 2 | 38.6 | 3.5 | 57.9 |
| 3 | 65.0 | 5.0 | 30.0 |
| 4 | 55.8 | 20.0 | 24.2 |
| 5 | 33.0 | 20.0 | 47.0 |

The shaded area within these lines encompasses compositions having ingredients in the proportions contemplated in this invention. On a molar basis, it will be seen that the proportions of the ingredients may be varied such that for each mol of $TiO_2$ present, there are from 0.59 to 4.66 mols of $PbO$ and from 1.56 to 22 mols of $SiO_2$.

The preferred range to produce the best combination of pigment properties falls within the shaded area on the graph, FIGURE 1, bounded by straight lines drawn joining points 6, 7, 8 and 9. These points indicate respectively the compositions tabulated below:

| Points | Percent by weight | | |
|---|---|---|---|
| | PbO | TiO$_2$ | SiO$_2$ |
| 6 | 41.2 | 7.3 | 51.5 |
| 7 | 45.9 | 8.2 | 45.9 |
| 8 | 42.4 | 15.2 | 42.4 |
| 9 | 38.4 | 13.7 | 47.9 |

The straight line, within the shaded area of FIGURE 1, connecting the points 4, 8, 9 and 10, point 10 indicating the composition (percent by weight) 35.5$PbO$, 12.7$TiO_2$, 51.8$SiO_2$, encompasses and represents all those compositions in which the ingredients $PbO$ and $TiO_2$ are in a 1 to 1 molar ratio and combine during the furnacing operation to form a pigment consisting essentially of lead titanate and silica. Increasing the $PbO$ ingredient results in a modified lead titanate-silica pigment in which the excess $PbO$, over that necessary to combine with the $TiO_2$, combines with some of the $SiO_2$ to form a lead titanate-lead silicate-silica pigment wherein the well known weathering properties of lead silicate supplement the pigment properties of lead titanate. Compositions having ingredients in the proportions to produce such pigments are covered by the shaded area of FIGURE 1 bounded by straight lines through points 2, 3, 4 and 10. Decreasing the $PbO$ ingredient results in a further useful modification by incorporating $TiO_2$ into the lead titanate-silica pigments which will produce pigments having tinting strengths in the higher ranges. These compositions are produced by selecting ingredients in the proportions embodied by the shaded area bounded by straight lines through points 4, 5 and 10.

The proportions of the constituents defined by the shaded area of the diagram and corresponding molar ratios noted above are important and critical. Pigments in which the ingredients are present in broader ranges than those given can be successfully made; however, it has been determined that in these coated pigments effective pigmentary properties are substantially reduced and/or the efficiency of the active ingredients is not improved.

The exact bonding mechanism of these silica cored coated pigments is not fully understood; however, it is believed that in the 1 to 1 PbO, $TiO_2$ molar ratio pigment the bond formed is essentially crystallographic. Where excess PbO is employed the combination of the constituents in the pigment product of this invention is in part physical and in part chemical. It is evident that chemical compounds are formed by dry reaction between $TiO_2$, PbO and $SiO_2$ and also that the free silica is physically combined with these reaction products. Primarily, it is believed that the lead silicate formed acts as the main bonding agent between the lead titanate and the silica.

While the pigment product of this invention as hereinbefore described consists essentially of PbO, $TiO_2$ and $SiO_2$, incidental impurities which may occur in the raw materials or which may be picked up in the manufacturing may be present in minor amounts. These will generally not exceed a total of 1% and will ordinarily be of a type not significantly effecting the desired properties of the pigment or the process by which it is produced.

While the methods of mixing the ingredients may vary broadly as will be appreciated by those skilled in the art, litharge, titanium dioxide and silica may be dry mixed in the proper proportions although better results are generally obtained when the ingredients are mixed in the form of an aqueous slurry. A preferred method is to precipitate basic lead carbonate in the agitating aqueous medium containing PbO, $TiO_2$ and $SiO_2$, by passing in $CO_2$ gas. This is advantageous because it results in the formation of smaller size particles of lead carbonate which are more reactive than the litharge particles in the formation of lead titanate and also aids in the filtering of the slurry before calcination. Other gases such as $SO_3$ can not advantageously be used since the lead compound formed would be relatively stable and not fully react with the titanium dioxide.

It is preferable, although not necessary, to add a small amount of acetic acid or some other suitable acid catalyst for the purpose of dissolving a small portion of the PbO, thus supplying a greater concentration of lead ions to the water solution while carbonating the PbO.

At the conclusion of the mixing operation the slurry is dewatered by filtering and drying. This may be accomplished by any of the standard methods employed, or the slurry may be transferred directly to a continuous rotary kiln in which the initial portion of the kiln will act as a drier and the subsequent portion as a calciner. The dried slurry is calcined at temperatures from about 400° C. to about 700° C. and preferably from about 600° C. to 650° C. The temperature of calcination is important since temperatures below 400° C. are generally ineffective. Temperatures above 700° C. complete a reaction speedily but afterward produce a partially sintered product gritty in character. The calcination time should generally be between 1 and 3 hours, preferably at about 2 hours.

In order to illustrate more clearly the nature and characteristics of the invention the following examples are presented.

EXAMPLE I

*Ingredient Charge, in Grams, Used in Experiments*

| Exp. | PbO | $TiO_2$ | $SiO_2$ | Acetic Acid |
|---|---|---|---|---|
| 1 | 572.0 | 202.4 | 850.0 | 1.42 |
| 2 | 571.5 | 101.7 | 850.0 | 1.42 |
| 3 | 571.9 | 51.4 | 850.0 | 1.42 |
| 4 | 3,397.0 | 1,212.8 | 3,350.0 | 8.4 |
| 5 | 3,397.0 | 606.4 | 3,350.0 | 8.4 |
| 6 | 3,397.0 | 303.2 | 3,350.0 | 8.4 |
| 7 | 1,846.9 | 141.7 | 850 | 1.42 |
| 8 | 1,965.2 | 702.4 | 850 | 1.42 |
| 9 | 602.1 | 361.7 | 850 | 1.42 |

Nine experiments using the charges of ingredients listed above were conducted according to the following method of preparation.

The litharge was wet bolted through a #100 screen and added to a 12" by 18" jar containing silica which was previously water ground for 16–18 hrs. in a 4 gallon porcelain mill to an average particle size of 7 microns. Titanium dioxide, slurried up with enough water to make a total slurry volume of 5 liters was then added. Acetic acid was added and carbon dioxide was introduced to the bottom of the jar at a rate of about 1.6 grams per minute while vigorously agitating the slurry mechanically till a pH of 7.0–6.8 was obtained. The slurry was then filtered, dried and passed through a Raymond mill to break up drying lumps. The material was then heated in a muffle furnace at 600–650° C. for 2 hours. The calcined material was then disintegrated in a hammer mill. Laboratory analysis showed the following:

| Experiment Number | PbO, percent by weight | $TiO_2$, percent by weight | $SiO_2$, percent by weight | Tinting Strength[1] |
|---|---|---|---|---|
| 1 | 35.5 | 12.7 | 51.8 | 220 |
| 2 | 37.3 | 6.7 | 56.0 | 160 |
| 3 | 38.6 | 3.5 | 57.9 | 150 |
| 4 | 42.4 | 15.2 | 42.4 | 230 |
| 5 | 45.9 | 8.2 | 45.9 | 170 |
| 6 | 47.8 | 4.3 | 47.8 | 150 |
| 7 | 65.0 | 5.0 | 30.0 | 150 |
| 8 | 55.8 | 20.0 | 24.2 | 240 |
| 9 | 33.0 | 20.0 | 47.0 | 250 |

[1] Tinting strength compared to white lead as 100.

Microscopical analysis of a random sample (exp. 4 above) showed that all particles were coated and had the following particle size characteristics:

Particle range _____ 1–45μ
Main portion _____ 2–18μ
Average diameter by surface mean _____ 7μ

The pigment products from the above experiments 1, 2 and 3 of Example I were subsequently made into paints by mixing the pigments with linseed oil, drier and volatile thinner at a pigment volume ratio of 30. These paints were applied to panels and compared with a control, regular lead titanate having the same pigment volume ratio, in a weatherometer.

After 450 hours of accelerated weathering tests the test pigments generally compared very well with the control. Indications were evident that the proportions of the ingredients will influence to some degree the properties of the novel pigments. It was found in this test, that with an increase of the PbO ingredient, at the expense of the $TiO_2$, fading decreased and sheen retention increased. Also, in the pigments having higher PbO, $TiO_2$ percentages, further improvements in fade resistance and color uniformity were evident. All the test pigments, however, showed the necessary characteristics for commercial paint applications.

Tests were also made under atmospheric conditions on mixed pigment paints. These were conducted using two control paints on panels. One control paint contained 25% regular lead titanate, 6.25% anatase titanium dioxide, 18.5% barytes, 25% ZnO and 25% magnesium silicate while the other contained 33% regular lead titanate, 33% leaded zinc oxide (35%) and 34% magnesium silicate. In the test panel paints the silica cored lead titanate, of the experiment 4 from the above Example I, was used as a replacement for the regular lead titanate by volume in the control paints mentioned above. In addition, there was a second replacement in which the silica cored lead titanate was used as a replacement for the regular lead titanate and the zinc oxide in the first control and the regular lead titanate and leaded zinc in the second control. These replacements were also made on a volume basis. After 24 months of exposure it was found that the painted panels containing the lead titanate-silica pigment of this invention were generally equal or slightly better than those painted with the control paints containing regular lead titanate. Superior results were obtained particularly in the ⅓ lead titanate, ⅓ leaded zinc oxide, ⅓ magnesium silicate formula where the silica cored lead titanate was used as a replacement for the regular lead titanate and leaded zinc oxide. This paint, weathered for 24 months, showed no chalking, whereas the control paints with leaded zinc oxide started to chalk several months earlier.

It will be generally appreciated from the above results that the novel pigment products of the invention combine the excellent pigmentary properties of lead titanate pigments with economy in the presence of silica, thus offering an economical superior durable pigment product.

While this invention has been described with reference to certain specific embodiments and by way of certain specific examples, these are illustrative only, and the invention is not to be construed as limited, except as set forth in the appended claims.

I claim:

1. A composite siliceous-lead titanate pigment consisting essentially of $SiO_2$ coated with PbO and $TiO_2$ said coating characterized by the presence of lead titanate.

2. A composite siliceous-lead titanate pigment consisting essentially of $SiO_2$ coated with PbO and $TiO_2$, the amounts of PbO, $TiO_2$ and $SiO_2$ being analytically present in such proportions by weight as may be represented by a point lying within that area of a trilinear diagram of composition PbO—$TiO_2$—$SiO_2$ defined as being bounded by straight lines joining in series points represented by the compositions:

| PbO | $TiO_2$ | $SiO_2$ |
|------|------|------|
| 38.6 | 3.5 | 57.9 |
| 65.0 | 5.0 | 30.0 |
| 55.8 | 20.0 | 24.2 |
| 33.0 | 20.0 | 47.0 |

3. A composite siliceous-lead titanate pigment consisting essentially of $SiO_2$ coated with PbO and $TiO_2$, the amounts of PbO, $TiO_2$ and $SiO_2$ being analytically present in such proportions by weight as may be represented by a point lying within that area of a trilinear diagram of composition PbO—$TiO_2$—$SiO_2$ defined as being bounded by straight lines joining in series points represented by the compositions:

| PbO | $TiO_2$ | $SiO_2$ |
|------|------|------|
| 38.6 | 3.5 | 57.9 |
| 65.0 | 5.0 | 30.0 |
| 55.8 | 20.0 | 24.2 |
| 35.5 | 12.7 | 51.8 |

4. A composite siliceous-lead titanate pigment consisting essentially of $SiO_2$ coated with PbO and $TiO_2$, the amounts of PbO, $TiO_2$ and $SiO_2$ being analytically present in such proportions by weight as may be represented by a point lying within that area of a trilinear diagram of composition PbO—$TiO_2$—$SiO_2$ defined as being bounded by straight lines joining in series points represented by the compositions:

| PbO | $TiO_2$ | $SiO_2$ |
|------|------|------|
| 41.2 | 7.3 | 51.5 |
| 45.9 | 8.2 | 45.9 |
| 42.4 | 15.2 | 42.4 |
| 38.4 | 13.7 | 47.9 |

5. A composite siliceous-lead titanate pigment consisting essentially of $SiO_2$ coated with PbO and $TiO_2$, the amounts of PbO, $TiO_2$ and $SiO_2$ being analytically present in such proportions by weight as may be represented by a point lying within that area of a trilinear diagram of composition PbO—$TiO_2$—$SiO_2$ defined as being bounded by straight lines joining in series points represented by the compositions:

| PbO | $TiO_2$ | $SiO_2$ |
|------|------|------|
| 55.8 | 20.0 | 24.2 |
| 33.0 | 20.0 | 47.0 |
| 35.5 | 12.7 | 51.8 |

6. A composite siliceous-lead titanate pigment consisting essentially of $SiO_2$ coated with PbO and $TiO_2$, the amounts of PbO, $TiO_2$ and $SiO_2$ being analytically present in such proportions by weight as may be represented by a point lying on a line within a trilinear diagram of composition PbO—$TiO_2$—$SiO_2$ said line joining points represented by the compositions:

| PbO | $TiO_2$ | $SiO_2$ |
|------|------|------|
| 55.8 | 20.0 | 24.2 |
| 35.5 | 12.7 | 51.8 |

7. A process for the manufacture of composite siliceous-lead titanate pigments which comprises the steps of forming an intimate water slurry mixture consisting essentially of lead monoxide, PbO, titanium dioxide, $TiO_2$ and silica, $SiO_2$, the amounts of PbO, $TiO_2$ and $SiO_2$ being analytically present in said mixture in such proportions by weight as may be represented by a point lying within that area of a trilinear diagram as bounded by straight lines joining in series points represented by the compositions:

| PbO | $TiO_2$ | $SiO_2$ |
|------|------|------|
| 38.6 | 3.5 | 57.9 |
| 65.0 | 5.0 | 30.0 |
| 55.8 | 20.0 | 24.2 |
| 33.0 | 20.0 | 47.0 | carbonating said mixture till said slurry has a pH in the range of about 6.8–7.0, and heating said mixture at a temperature at about 400° C. to about 700° C. for a period of from 1 to 3 hours.

References Cited in the file of this patent

UNITED STATES PATENTS

| 2,215,737 | Kinzie | Sept. 24, 1940 |
| 2,296,963 | Turbett et al. | Sept. 29, 1942 |
| 2,607,659 | Rummery | Aug. 19, 1952 |